United States Patent
Kim et al.

(10) Patent No.: US 9,600,033 B2
(45) Date of Patent: Mar. 21, 2017

(54) IMPACT-RESISTANT DISPLAY DEVICE

(71) Applicant: Samsung Display Co., Ltd., Yongin, Gyeonggi-Do (KR)

(72) Inventors: Kil-Joo Kim, Yongin (KR); Gang-Min Kim, Yongin (KR); Jung-Hee Kim, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 324 days.

(21) Appl. No.: 14/037,178

(22) Filed: Sep. 25, 2013

(65) Prior Publication Data

US 2014/0346947 A1    Nov. 27, 2014

(30) Foreign Application Priority Data

May 21, 2013  (KR) .......................... 10-2013-0057245

(51) Int. Cl.
*H01J 1/62*     (2006.01)
*G06F 1/16*     (2006.01)

(52) U.S. Cl.
CPC .......... *G06F 1/1656* (2013.01); *G06F 1/1626* (2013.01); *G06F 1/1637* (2013.01)

(58) Field of Classification Search
CPC ..................................................... H05B 33/04
USPC ........................................................ 313/512
See application file for complete search history.

(56) References Cited

U.S. PATENT DOCUMENTS

| | | | | |
|---|---|---|---|---|
| 6,452,323 B1* | 9/2002 | Byrum | .................. | H01J 61/302 313/483 |
| 2003/0090615 A1* | 5/2003 | Park | ...................... | G02F 1/1339 349/153 |
| 2004/0171184 A1* | 9/2004 | Maruyama | .......... | H01L 51/5237 438/33 |
| 2004/0217703 A1* | 11/2004 | Wittmann | ........... | H01L 51/5237 313/512 |
| 2007/0170845 A1* | 7/2007 | Choi | ................... | H01L 51/5246 313/504 |
| 2009/0261726 A1* | 10/2009 | Gomi | .................. | H01L 51/5237 313/512 |
| 2009/0289548 A1* | 11/2009 | Maruyama | .......... | H01L 51/5259 313/512 |
| 2011/0019351 A1* | 1/2011 | Bayne et al. | ............ | 361/679.01 |

FOREIGN PATENT DOCUMENTS

| | | |
|---|---|---|
| CN | 101256969 A | 9/2008 |
| CN | 100568526 C | 12/2009 |
| CN | 102046900 A | 5/2011 |
| KR | 1020070077010 A | 7/2007 |
| KR | 1020090121501 A | 11/2009 |

* cited by examiner

*Primary Examiner* — Joseph L Williams
(74) *Attorney, Agent, or Firm* — Innovation Counsel LLP

(57) ABSTRACT

Provided is a display device including, a substrate, a display panel disposed on the substrate, a sealing substrate disposed over the display panel, a sealing part disposed between the substrate and the sealing substrate to at least partially surround the display panel, and a buffer part proximate to a corner region of the sealing part to at least partially surround the corner region of the sealing part, the buffer part extending from the substrate to the sealing substrate.

9 Claims, 6 Drawing Sheets

FIG. 4
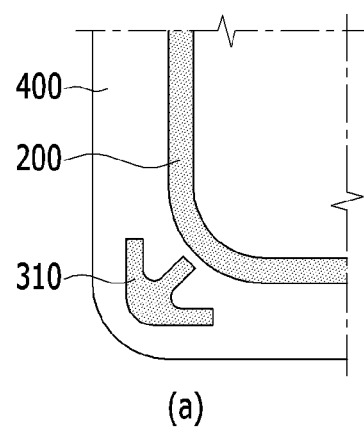
(a)
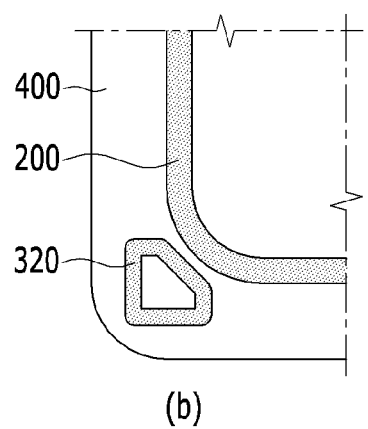
(b)
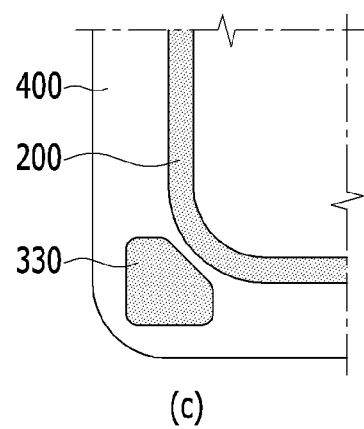
(c)
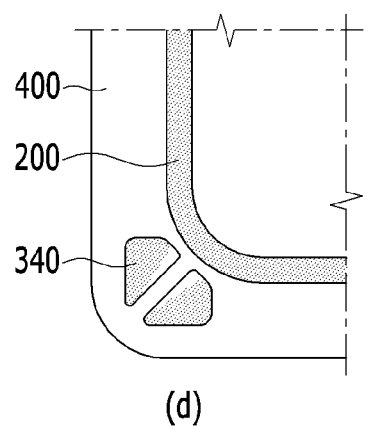
(d)

IMPACT-RESISTANT DISPLAY DEVICE

CROSS-REFERENCE TO RELATED APPLICATION

This application claims priority to, and the benefit of, Korean Patent Application No. 10-2013-0057245 filed in the Korean Intellectual Property Office on May 21, 2013, the entire contents of which are incorporated herein by reference.

BACKGROUND OF THE INVENTION (a) Field of the Invention

The present disclosure relates generally to display devices. More specifically, the present disclosure relates to impact-resistant display devices.

(b) Description of the Related Art

Current display devices come in many different forms, utilizing many different technologies. Examples of such display devices are a liquid crystal display (LCD), a plasma display panel (PDP), an organic light emitting diode device (OLED device), field effect display (FED), electrophoretic display device, and the like.

The OLED device includes two electrodes and an organic emission layer disposed therebetween. Here, electrons from one electrode and holes from the other electrode combine in the organic emission layer to thereby form excitons, which release energy to emit light.

The OLED device has a self-luminance characteristic and, unlike the LCD, does not need a separate light source, thereby decreasing thickness and weight thereof. Further, the OLED device exhibits desirable characteristics such as low power consumption, high luminance, and fast response speed, and thus receives attention as a potential next generation display device.

The foregoing organic emission layer may be degraded due to external factors such as external moisture or oxygen or ultraviolet rays, and thus packaging technology for sealing the organic emission layer is of interest.

Referring to FIG. 1, in the case of a portable terminal including an OLED device, a sealing substrate 10 and a sealing member 20 are used to seal an organic emission layer. However, the sealing substrate 10 and the sealing member 20 are vulnerable to external impact. That is, the sealing substrate 10 and the sealing member 20 may be damaged by external impact, causing moisture or oxygen to infiltrate into the organic emission layer.

The above information disclosed in this Background section is only for enhancement of understanding of the background of the invention and therefore it may contain information that does not form the prior art that is already known in this country to a person of ordinary skill in the art.

SUMMARY

The present invention provides a display device having advantages of preventing damage to a sealing member sealing the display panel due to external impact, and thus preventing resultant infiltration of oxygen or moisture into the display panel.

An exemplary embodiment provides a display device including a substrate, a display panel, a sealing substrate, a sealing part, and a buffer part. The display panel is disposed on the substrate. The sealing substrate is disposed over the display panel. The sealing part is disposed between the substrate and the sealing substrate to at least partially surround the display panel. The buffer part is proximate to a corner region of the sealing part to at least partially surround the corner region of the sealing part, the buffer part extending from the substrate to the sealing substrate.

The buffer part may be contact both the substrate and the sealing substrate.

Here, at least a section of the buffer part may have two portions oriented so as to have an included angle therebetween, where this included angle can be a predetermined angle.

Here, a sectional shape of the buffer part may correspond to a sectional shape of the corner region of the sealing part.

Here, a thickness of the buffer part in a direction parallel to the substrate may be equal to or larger than a thickness of the sealing part in the same direction.

Here, the buffer part may have a hole therein.

Here, a section of the buffer part may have an at least approximate arrow shape.

The buffer part may be plural in number and multiple corner regions may also be present. Each buffer part may be disposed adjacent to a respective one of the corner regions.

The buffer part and the sealing part may be formed of the same material.

The buffer part may be formed of any one or more of acryl-based resin, frit, metal, and silicon-based resin.

According to an exemplary embodiment of the present invention, the display device can prevent the sealing member sealing the display panel from being damaged by external impact, and thus prevent the display panel from being degraded by infiltration of oxygen or moisture.

BRIEF DESCRIPTION OF THE DRAWINGS

FIG. 4A to FIG. 4D are partial cross-sectional views showing several shapes of buffer parts, respectively.

DETAILED DESCRIPTION OF THE EMBODIMENTS

Figure 1:
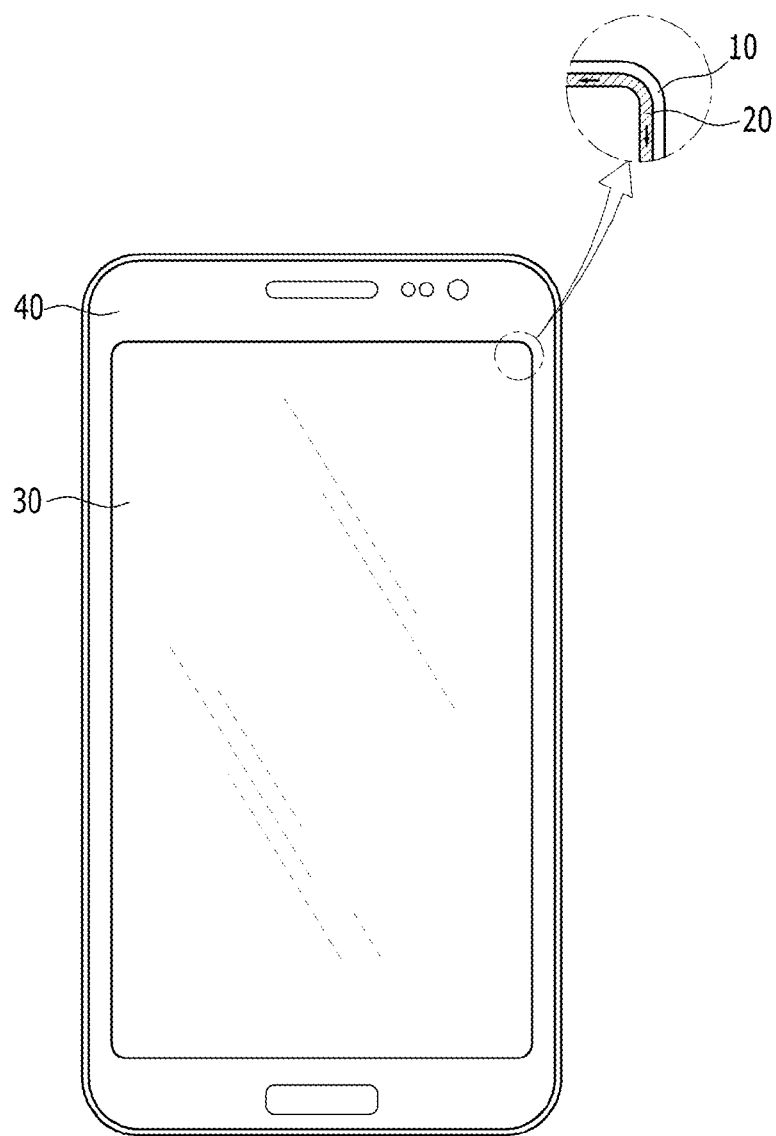
FIG. 1 is a portable terminal of the prior art, including a sealing substrate and a sealing member.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Furthermore, as the size and thickness of the respective structural components shown in the drawings are arbitrarily illustrated for explanatory convenience, the present invention is not necessarily limited to the illustrated sizes and thicknesses.

In the drawings, the thickness of layers, films, panels, regions, etc., are exaggerated for clarity. In the drawings, for understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising", will be understood to imply the inclusion of stated elements but not the exclusion of any other elements. Further, in the specification, the word "~on" means positioning on or above or below the object portion, but does not essentially mean positioning on the upper side of the object portion based on a gravity direction.

Referring to FIG. 2 to FIG. 6, in order to prevent a sealing member sealing a display panel from being damaged by external impact in a display device, a buffer part may be formed outside a corner region of the sealing member.

The display device according to an exemplary embodiment may include a substrate 400, a display panel 500, a sealing substrate 100, a sealing part 200, and a buffer part 300.

An organic light emitting diode (OLED) device including an organic emission layer is employed in display panel 500 in the display device of this exemplary embodiment. However, the display device is not limited to utilizing an OLED device, but may instead be, for example, a liquid display device, a field effect display device, or an electrophoretic display device.

The substrate 400 may be formed of an insulating substrate made of glass, quartz, ceramic, plastic, or the like. However, the substrate 400 is not limited thereto, and may instead be formed of a metal substrate made of stainless steel or the like.

Figure 5:
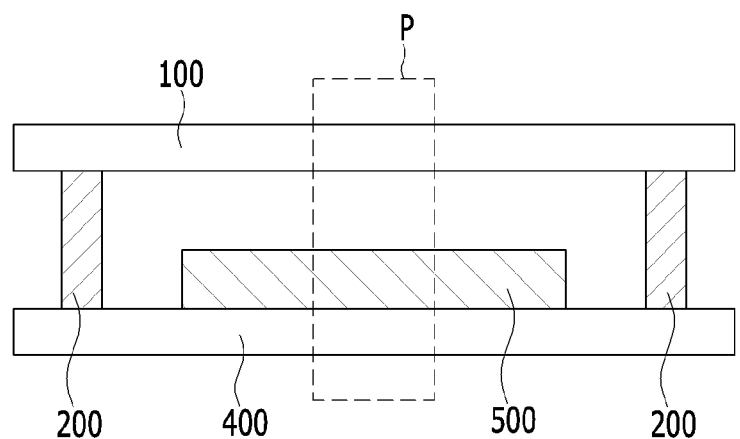
FIG. 5 is a cross-sectional view taken along line A-A of FIG. 3.

In addition, referring to FIG. 5, the display panel 500 may be formed on the substrate 400 to display an image. Here, the display panel 500 includes an organic emission layer, and detailed descriptions thereof will be later described.

The sealing substrate 100 sealing the display panel 500 is disposed above the display panel 500. The sealing substrate 100 protects the display panel 500 from external moisture, oxygen, or impacts. Particularly, the sealing substrate 100 may prevent the organic emission layer of the display panel 500 from being degraded by moisture or oxygen.

Here, the sealing substrate 100 may be formed of various materials, and specifically, may be formed of a glass material or a plastic material.

Meanwhile, the sealing part 200 is disposed between the sealing substrate 100 and the substrate 400. In addition, the sealing part 200 is disposed around the display panel 500 to surround the display panel 500.

Here, the sealing substrate 100 and the substrate 400 are coupled to each other by the sealing part 200. The sealing part 200 may be formed of a material containing frit. However, the sealing part is not limited thereto, and may be formed of any of various known materials by which the sealing substrate 100 and the substrate 400 are coupled with each other.

Figure 2:
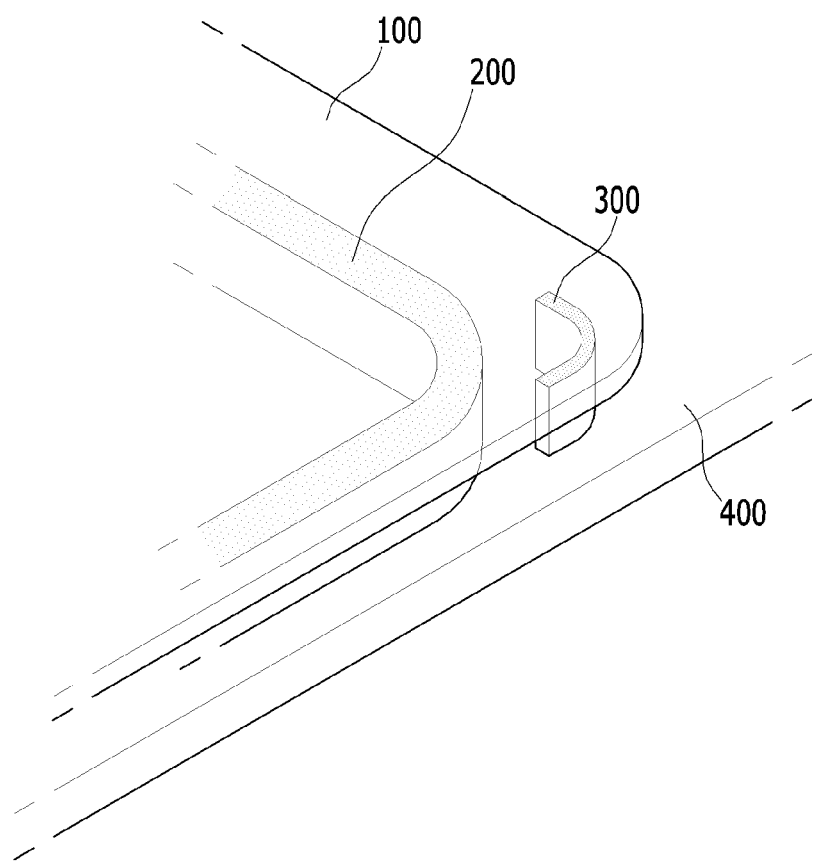
FIG. 2 is a partial perspective view of a display device according to an exemplary embodiment.
Figure 3:
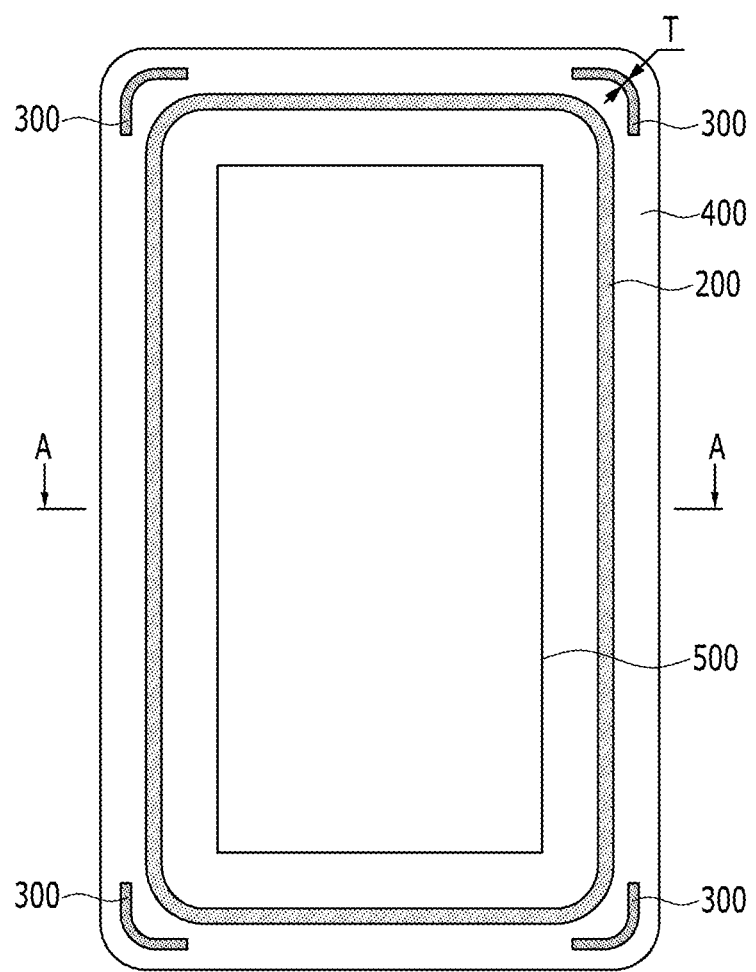
FIG. 3 is a plan view of a display device according to an exemplary embodiment.

Referring to FIG. 2 and FIG. 3, the display device according to an exemplary embodiment may include a buffer part 300 formed adjacent or proximate to a corner region of the sealing part 200.

The buffer part 300 may absorb external impact to prevent the sealing part 200 and the sealing substrate 100 from being damaged by external impact. That is, in the case where external impact is generated, the buffer part 300 may absorb at least some of the impact transferred to the corner regions of the sealing part 200.

The buffer part 300 is disposed to at least partially surround the corner region of the sealing part 200. More specifically, the buffer part 300 is spaced apart from the corner region at a predetermined distance. In addition, the buffer part 300 is disposed between the substrate 400 and the sealing substrate 100.

Here, the buffer part 300 may contact, or extend between, both the substrate 400 and the sealing substrate 100. That is, like the sealing part 200, the buffer part 300 contacts both the sealing substrate 100 and the substrate 400 to thereby couple the sealing substrate and the substrate 400 to each other.

Meanwhile, referring to FIG. 3, multiple buffer parts 300 may be used. Here, the plural buffer parts 300 are, respectively, disposed adjacently to corner regions for the respective corner regions. That is, one buffer part 300 is present at or near each corner of the sealing part 200 and/or substrate 400. The buffer part 300 is disposed at each of the respective corner regions, to thereby prevent impact forces from transferring to the sealing part 200, or reduce the amount of force transferred thereto.

According to an exemplary embodiment, the buffer part 300 may be formed in a shape corresponding to a sectional shape of the corner region of the sealing part 200. That is, the buffer part 300 may be formed in a sectional shape the same as or similar to the sectional shape of the sealing part 200, i.e. the buffer part 300 may have a shape the same as or similar to the shape of the corner of sealing part 200 that it covers or corresponds to.

Referring to FIG. 2 and FIG. 3, the buffer part 30 may have a curved or arcuate shape, or a shape bent at a predetermined angle. In other words, it may have two extensions or portions with a predetermined included angle therebetween. Here, the bending or included angle of the buffer part 300 may be equal to a bending or included angle of the sealing part 200. However, the bending or included angle of the buffer part 300 is not limited thereto, but may be different from the bending or included angle of the sealing part 200.

Here, the thickness of the buffer part 300 is equal to or larger than the thickness of the sealing part 200. Here, the thickness T of the buffer part 300 is measured in a direction perpendicular to an edge of the substrate 400 shown in FIG. 3.

Since the buffer 300 has the foregoing thickness, the buffer part 300 itself can scatter or dissipate the impact transferred from the external part.

Meanwhile, referring to FIG. 4A to FIG. 4D, the buffer part 300 may take on various shapes and configurations.

For example, as shown in FIG. 4A, the buffer part 300 may have an at least approximately arrow shaped configuration, i.e. a shape having three extensions protruding from a central body. In this case, the extensions extend toward a center of the arc of the adjacent corner of sealing part 200, as well as ±45° thereto, although any directions are contemplated. In addition, as shown in FIG. 4B, a hole may be formed in the buffer part 300. Here, the outer edge and the hole of buffer part 300 may have any shape. Meanwhile, as shown in FIG. 4C, the section of the buffer part 300 may have a polygonal shape of which an inside is filled. In addition, as shown in FIG. 4D, the section of the buffer part 300 may have a configuration with plural polygons of any shape, number, and spacing.

The buffer part 300 may have any shape or configuration, so long as it reduces or absorbs impact forces and thus reduces or eliminates the amount of force transferred to, for example, the corner region of the sealing part 200. That is, the buffer part 300 may be formed in various shapes so long as the impact transferred from the external part is at least partially dissipated inside the buffer part 300.

According to an exemplary embodiment, the buffer part 300 and the sealing part 200 may be formed of the same material. For example, in the case where the sealing part 200 is formed of a material containing frit, the buffer part 300 may also be formed of the same material containing frit.

Alternatively, the buffer part 300 may be formed of a different material from the sealing part 200. For example, the buffer part 300 may be formed of any one of acryl-based resin, frit, metal, and silicon-based resin.

Figure 6:
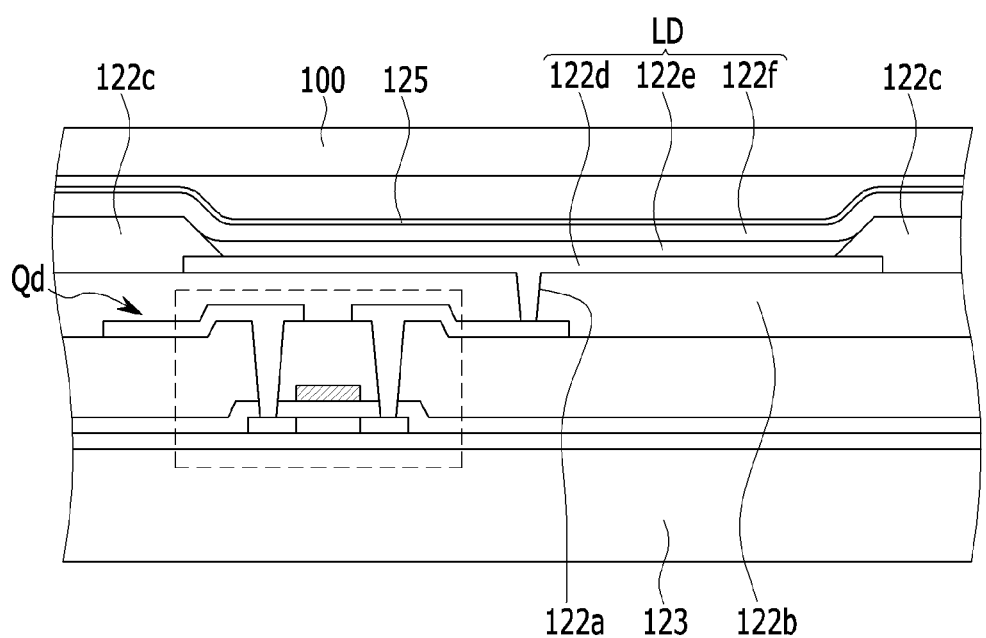
FIG. 6 is an enlarged view of area P of FIG. 5.

FIG. 6 is an enlarged cross-sectional view of the display device, showing area P of FIG. 5 in further detail.

With reference to FIG. 6, a display device, particularly an organic light emitting diode (OLED) device, according to an exemplary embodiment, will be described in more detail.

Referring to FIG. 6, a driving transistor (Qd) may be formed above a display substrate 123 which may be formed of transparent glass, plastic, or the like. Here, the display substrate 123 corresponds to the substrate 400 of FIG. 5, although this need not necessarily be the case.

Here, a protective layer 122b is formed on the driving transistor Qd. The protective layer 122b may be formed of an inorganic material or an organic material. In the case where the protective layer 122b is formed of the organic material, a surface thereof may be flat.

The protective layer 122b may be formed with a via hole 122a exposing a portion of the driving transistor Qd.

In addition, a first electrode 122d is formed on the protective layer 122b. The first electrode 122d may include a reflective electrode and a transparent electrode formed thereon. The reflective electrode may be formed of metal having high reflectivity, such as, silver (Ag) or aluminum (Al), or an alloy thereof. The transparent electrode may be formed of a transparent conductive oxide, such as indium tin oxide (ITO) or indium zinc oxide (IZO).

Here, a pixel defining layer 122c is formed on the protective layer 122b while covering the periphery of the edge of the first electrode 122d.

Referring to FIG. 6, an organic emission layer 122e is formed on the first electrode 122d In addition, a second electrode 122f is formed on the organic emission layer 122e and the pixel defining layer 122c.

The organic emission layer 122e may include a light emission layer (not shown) in which light emission actually occurs, and further include organic layers (not shown) for effectively transferring carriers, such as holes or electrodes, to the light emission layer. The organic layers may include a hole injection layer and a hole transfer layer which are disposed between the first electrode 122d and the light emission layer, as well as an electron injection layer and an electron transfer layer which are disposed between the second electrode 122f and the light emission layer.

In addition, a capping layer 125 may be formed on the second electrode 122f to cover and protect the second electrode 122f, and the capping layer 125 may be formed of an organic layer.

In addition, according to an exemplary embodiment, a sealing substrate 100 may be spaced apart from the capping layer 125.

Meanwhile, several layers disposed between the display substrate 123 and the sealing substrate 100 may be included within a display panel 500 (see FIG. 5)

The display device according to an exemplary embodiment can prevent the sealing part sealing the display panel from being damaged due to external impact, via inclusion of added buffer parts surrounding, at least partially surrounding, or placed proximate to the corresponding corner regions of the sealing part.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
| --- | --- |
| 100: sealing substrate | 200: sealing part |
| 300: buffer part | 400: substrate |
| 500: display panel | |

What is claimed is:

1. A display device, comprising:
    a substrate;
    a display panel disposed on the substrate;
    a sealing substrate disposed over the display panel;
    a sealing part disposed between the substrate and the sealing substrate to at least partially surround the display panel; and
    a buffer part proximate to a corner region of the sealing part to at least partially surround the corner region of the sealing part while being spaced apart from the sealing part, the buffer part having a portion extending from the substrate to the sealing substrate while also being positioned between an outer edge of the sealing part and an outer edge of the sealing substrate;
    wherein the buffer part has a hole therein.

2. The display device of claim 1, wherein the buffer part contacts both the substrate and the sealing substrate.

3. The display device of claim 1, wherein the buffer part has two portions oriented so as to have an included angle therebetween.

4. The display device of claim 1, wherein a sectional shape of the buffer part corresponds to a sectional shape of the corner region of the sealing part.

5. The display device of claim 4, wherein a thickness of the buffer part in a direction parallel to the substrate is equal to or larger than a thickness of the sealing part in the same direction.

6. The display device of claim 1, wherein a section of the buffer part has an at least approximate arrow shape.

7. The display device of claim 1, further comprising multiple buffer parts and multiple corner regions, each buffer part being disposed adjacent to a respective one of the corner regions.

8. The display device of claim 1, wherein the buffer part and the sealing part are formed of the same material.

9. The display device of claim 1, wherein the buffer part is formed of any one or more of acryl-based resin, frit, metal, and silicon-based resin.

* * * * *